D. F. FESLER.
LUBRICATING APPARATUS.
APPLICATION FILED APR. 21, 1919.
1,341,892.
Patented June 1, 1920.
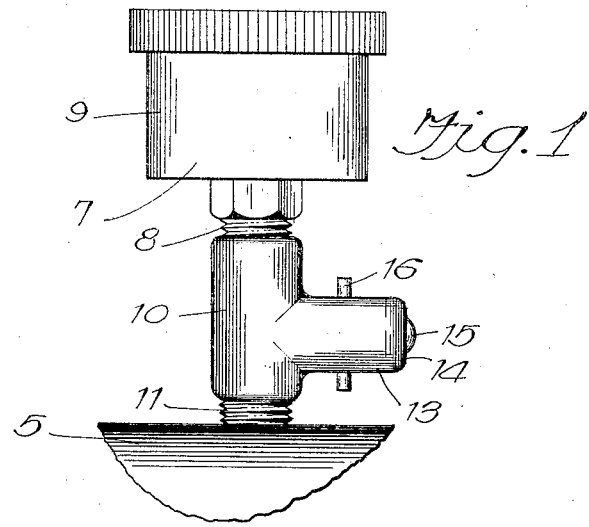
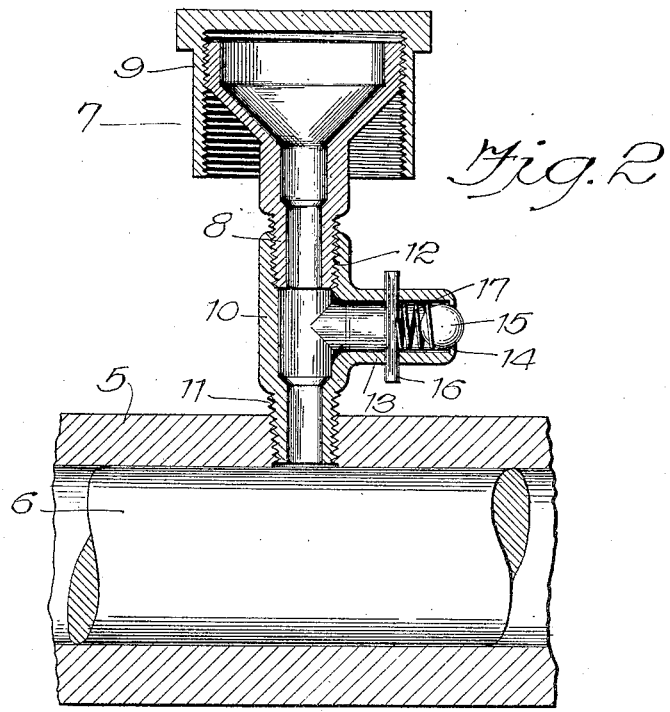

UNITED STATES PATENT OFFICE.

DOUGLAS F. FESLER, OF EVANSTON, ILLINOIS, ASSIGNOR, BY MESNE ASSIGNMENTS, TO THE BASSICK MANUFACTURING COMPANY, A CORPORATION OF DELAWARE.

LUBRICATING APPARATUS.

1,341,892.   Specification of Letters Patent.   Patented June 1, 1920.

Application filed April 21, 1919. Serial No. 291,575.

*To all whom it may concern:*

Be it known that I, DOUGLAS F. FESLER, a citizen of the United States, residing at Evanston, in the county of Cook and State of Illinois, have invented a certain new and useful Improvement in Lubricating Apparatus, of which the following is a full, clear, concise, and exact description, reference being had to the accompanying drawings, forming a part of this specification.

My invention relates to improvements in lubricating apparatus, and is especially concerned with that type of lubricating apparatus wherein the bearings to be lubricated are provided with coupling members by means of which the discharge conduit of a grease gun can be connected with the coupling members in oil tight relation so that lubrication can be supplied to the bearings under extremely high pressure, the grease gun being provided with a flange having a screw-threaded flange rod by means of which extremely high pressure can be exerted upon the lubricant in the grease gun. Such an apparatus is disclosed and claimed in the co-pending applications of Arthur V. Gullborg, Serial Numbers 216,586 and 267,850, filed February 11, 1918, and December 21, 1918, respectively.

The objects of my invention are:

First: To provide means whereby grease cups such as are at present employed for lubricating auto vehicles and other apparatus may be utilized in connection with means for forcing lubricant into the bearings under high pressure;

Second: To provide means to be interposed between grease cups of the character now employed and the bearings to be lubricated, of such a character that the bearings can be supplied with fresh lubricant under comparatively high pressure, and the grease cup can be filled by the same operation; and Third: To provide apparatus of the type described of such a character that lubricant can be initially supplied to the bearings under a high pressure to dislodge the used lubricant from the bearings, and the grease cup can then be employed for supplying lubricant to the bearings from time to time under a reduced pressure, as desired.

Other objects will definitely appear as this description progresses, reference being had to the accompanying drawing, in which:

Figure 1 is a side elevation of a bearing equipped with my improved device, a portion of the bearing being broken away; and Fig. 2 is a longitudinal section through the bearing and my improved lubricating device.

Similar reference characters will be used in both figures for indicating similar parts.

Referring to the drawings, the reference character 5 indicates a portion of a bearing in which is journaled a shaft 6. The reference character 7 indicates a grease cup of conventional design having an externally screw-threaded discharge conduit 8 and an adjustable cap or cover 9. In different kinds and types of machinery equipped with grease cups of the type described and illustrated, the grease cups are filled by first removing the cap or cover 9 and filling the grease cup proper 7. A quantity of grease is also placed in the cap or cover 9, and the cover is then replaced upon the cup, and by screwing the cap upon the cup from time to time, any desired amount of lubricant can be supplied to the bearing as desired. With such an arrangement it is difficult, however, if not impossible, to exert any very material pressure upon the lubricant to force it into the bearing.

I propose to remove the grease cups described above from the bearing and to insert in their place a tubular coupling member 10, one end of which is externally screw-threaded for this purpose, as shown at 11, and the other end of which is internally screw-threaded, as shown at 12, for receiving the externally screw-threaded discharge conduit of the grease cup. A tubular extension 13 extends from the side of the coupling member 10 and communicates therewith. The free end of the tubular extension 13 is flanged inwardly, as shown at 14, to provide an intake port and a seat for the closure 15. A pin 16 extends through both walls of the tubular extension 13, and a compression spring 17 is interposed between the closure 15 and the pin 16. The spring 17 tends to maintain the closure 15 in its closed position.

The purpose of the pin 16 is to provide means for co-acting with the discharge conduit of a grease gun such as that disclosed in the co-pending applications of Arthur V. Gullborg above referred to, to lock the discharge conduit of the grease gun to the tubular extension in fluid-tight relation, so that the grease gun may be employed for forcing lubricant into the tubular coupling member 10 under extremely high pressures.

When it is desired to supply lubricant to a bearing by means of my apparatus, the cap is first screwed down to substantially the position shown in Fig. 2, or, if desired, still farther, so as to provide an effective seal between the top of the cap and the upper edge of the grease cup. If the screw threaded portion of the cup is of sufficient extent, the screw threads themselves will form an effective seal against the escape of the lubricant. The discharge conduit of a grease gun, such, for instance, as that disclosed in the co-pending applications of Arthur V. Gullborg above referred to, will then be connected with the tubular extension 13, and the grease gun will be actuated to force lubricant into the tubular member 10. As the lubricant is continued to be forced into the tubular member, a portion of it will find its way to the bearing, and the resistance of the bearing to the passage of the lubricant will cause the lubricant to be forced upwardly into the grease cup until the pressure created in the grease cup exceeds the resistance of the bearing. The continued forcing of lubricant into the tubular member 10 will then cause the fresh lubricant to force the old lubricant from the bearing and supply it with fresh lubricant. When this has been accomplished, the cap 9 can be completely removed from the cup 7, or unscrewed sufficiently to permit the air contained in the grease cup and the cap to escape between the threads of the cap and the cup as the lubricant is forced into these members under pressure. In this manner, both the cup and the cap can be filled with lubricant very quickly and without any difficulty whatever. The grease gun can then be detached from the tubular extension 13, and whenever it is desired to supply fresh lubricant to the bearing under a reduced pressure, the cap 9 can be rotated in a proper direction to accomplish this result.

While I have described the details of the preferred embodiment of my invention, it is to be clearly understood that my invention is not to be limited to these details, but is capable of other adaptations and modifications within the scope of the appended claims.

Having thus described my invention, what I claim is:

1. The combination with a grease cup having an adjustable cover and an externally screw-threaded discharge conduit, of means for securing said grease cup to a bearing, comprising a tubular coupling member having one end internally screw-threaded to receive said screw-threaded conduit, and its other end externally screw-threaded for making connection with the bearing, a tubular extension connecting with said coupling member, the free end of said tubular extension being flanged inwardly to form an intake opening, a spring-pressed closure for said opening, and means on said tubular extension for detachably connecting the discharge conduit of a grease gun with said tubular extension.

2. The combination with a grease cup having an externally screw-threaded discharge conduit, of means for securing said grease cup to a bearing, comprising a tubular coupling member having one end internally screw-threaded to receive said screw-threaded conduit, and its other end externally screw-threaded for making connection with the bearing, a tubular extension connecting with said coupling member, and means on said tubular extension for detachably connecting the discharge conduit of a grease gun with said tubular extension.

3. The combination with a grease cup having a screw-threaded conduit, of means for connecting said grease cup with a bearing comprising a tubular coupling member having one end screw-threaded for co-acting with the screw-threaded conduit of said grease cup, the other end of said coupling member being screw-threaded, a tubular extension communicating with said coupling member, and means on said tubular extension for detachably connecting the discharge conduit of a grease gun with said tubular extension.

4. As an article of manufacture, a coupling member comprising a tubular member having internal threads at one end and external threads at the other end, a tubular extension communicating with said tubular member, an inwardly-opening spring-pressed closure for the free end of said tubular extension, and means on said tubular extension for detachably connecting the discharge conduit of a grease gun with said tubular extension.

In witness whereof, I hereunto subscribe my name this 15 day of April, 1919.

DOUGLAS F. FESLER.

Witnesses:
ARTHUR V. GULLBORG,
JOHN L. STEFFEN.